(12) United States Patent
Cazenave et al.

(10) Patent No.: US 8,979,103 B2
(45) Date of Patent: Mar. 17, 2015

(54) TUBULAR STRUCTURE FOR FORMING ESPECIALLY AN AXLE OF THE RUNNING GEAR OF A MOTOR VEHICLE

(75) Inventors: Christophe Cazenave, Leuvill sur Orge (FR); Francois Le Gourvellec, Rambouillet (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 157 days.

(21) Appl. No.: 13/395,340

(22) PCT Filed: Sep. 10, 2010

(86) PCT No.: PCT/FR2010/051892
§ 371 (c)(1),
(2), (4) Date: Mar. 9, 2012

(87) PCT Pub. No.: WO2011/030074
PCT Pub. Date: Mar. 17, 2011

(65) Prior Publication Data
US 2012/0175941 A1   Jul. 12, 2012

(30) Foreign Application Priority Data
Sep. 11, 2009   (FR) ...................................... 09 56275

(51) Int. Cl.
*B62D 21/00* (2006.01)
*B60B 35/16* (2006.01)
(Continued)

(52) U.S. Cl.
CPC ............ *B62D 27/023* (2013.01); *B60B 35/004* (2013.01); *B60B 35/04* (2013.01); *B60Y 2200/11* (2013.01)
USPC .................... 280/124.109; 180/312; 301/137; 228/135; 228/182; 29/527.1; 29/897.2; 29/463; 29/525.14

(58) Field of Classification Search
CPC .... B60B 35/004; B60B 35/04; B62D 27/023; B60Y 2200/11
USPC ......... 280/124.109; 180/312; 301/137, 124.1; 228/135, 178, 182; 29/525.01, 527.1, 29/897.2, 463, 525.14
See application file for complete search history.

(56) References Cited

U.S. PATENT DOCUMENTS 4,232,881 A * 11/1980 Kolbel et al. ........... 280/124.128
4,899,843 A *  2/1990 Takano et al. ................. 180/312
(Continued)

FOREIGN PATENT DOCUMENTS

DE    19808172 A1   9/1998
DE    19910575 A1   9/2000
(Continued)

OTHER PUBLICATIONS

International Search Report from corresponding International Application No. PCT/FR2010/051892, mailed Jan. 31, 2011.

*Primary Examiner* — Paul N Dickson
*Assistant Examiner* — Joselynn Y Sliteris
(74) *Attorney, Agent, or Firm* — Polster, Lieder, Woodruff & Lucchesi, L.C.

(57) ABSTRACT

The invention relates to a tubular structure (1) that can form part of a motor vehicle axle, comprising at least one first tubular élément (15), at least one second tubular élément (16) and a Connecting piece (61, 62) fixing the first and second tubular éléments (15, 16) by welding, such that the Connecting piece (61, 62) is welded to one (15) of the two tubular éléments (15, 16) by at least one weld bead extending along a line forming said tubular élément (15).

12 Claims, 2 Drawing Sheets

(51) Int. Cl.
*B62D 27/02* (2006.01)
*B60B 35/00* (2006.01)
*B60B 35/04* (2006.01)

(56) References Cited

U.S. PATENT DOCUMENTS 6,047,978 A * 4/2000 Watanabe et al. ...... 280/124.106
7,055,837 B2 * 6/2006 Noble .................... 280/124.155
7,204,498 B2 * 4/2007 Alesso et al. .......... 280/124.106
7,584,815 B2 * 9/2009 Ogawa et al. ................. 180/312
2010/0244497 A1 * 9/2010 Honda et al. ................. 296/205

FOREIGN PATENT DOCUMENTS

| | | |
|---|---|---|
| EP | 1671821 A1 | 6/2006 |
| EP | 1787833 A1 | 5/2007 |
| JP | 2000318420 A | 11/2000 |

* cited by examiner

TUBULAR STRUCTURE FOR FORMING ESPECIALLY AN AXLE OF THE RUNNING GEAR OF A MOTOR VEHICLE

CROSS-REFERENCE TO RELATED APPLICATIONS

This application is the US National stage, under 35 U.S.C. §371, of International App. No. PCT/FR2010/051892 which was filed on Sep. 10, 2010 and claims priority to French Application No. 0956275 which was filed on Sep. 11, 2009, and which is incorporated herein by reference.

STATEMENT REGARDING FEDERALLY SPONSORED RESEARCH

Not Applicable.

BACKGROUND

This invention relates to a tubular structure having a link between two tubular members. More specifically, a tubular structure includes a first tubular member, a second tubular member, and a connector interconnecting the two tubular members, such as by welding.

U.S. Pat. No. 4,660,345 discloses a tubular assembly with a connector assembled by welding a pair of tubular members. In particular, in FIG. 24 welding seams are visible on the tubular assembly. The welding seams are generally positioned along radial lines across the surface of the tubular members to be assembled. During welding, heat is created along these seams and creates a radial expansion of the tube. During cooling, the effects of the expansion may leave the tube with a residual curvature. This residual curvature is difficult to model because it is dependent on the molecular structure of the tube, which is rarely homogeneous. This risk is even more critical when the weld seams do not run over the entire peripheral surface of the tubes, which can cause expansion of one portion of the tube and no expansion of the other portion, thereby creating residual stresses at the intersection of the two portions.

One aspect of the present invention includes an assembly having two tubular members secured by welding a connector that prevents the appearance of curvatures during assembly of the tubular members. For this purpose, the invention has a tubular structure, such as a portion of a vehicle axle, including at least one first tubular member, at least one second tubular member, and a connector interconnecting the first and second tubular members by welding. The connector welds onto one of the two tubular members with at least one welding bead that extends along a generating line of the tubular member. The end of the second tubular member seats against the first tubular member, with the axis of the end of the second tubular member generally in the same plane as the axis of the first tubular member.

In one embodiment, the connector welds onto the two tubular members with at least one welding bead extending along one of the generating lines of each of the two tubular members, with the ends of the two tubular members having a generally circular cross-section.

Thus, the connector securing the two tubular members includes a first welded portion on the second connecting member and a second welded portion on the first connecting member. The first portion of the connector includes a generally V-shaped or U-shaped section, with the ends defining the contact lines between the connector and the end of the second tubular member. The welding seams are carried out along these contact lines. The spacing between the ends are preferably less than or equal to the outside diameter of the circular end of the second tubular member. The second portion of the connector is generally planar, with the end portion having a straight edge that defines a rectilinear contact line between the connector and the first tubular member. The welding seam is produced along this contact line. The connector includes an indexing hole that allows positioning of the connector in relation to a reference point on the first tubular member during assembly by welding the connector on the first tubular member.

In another embodiment, the connector includes two half-shells positioned diametrically on opposite sides of the second tubular member, so that the straight edges of the second portions of the two half-shells sandwich the first tubular member. The second tubular member also includes an indexing hole that allows positioning of the second tubular member in relation to a reference point on the first tubular member or in relation to one indexing hole of one of the two half-shells.

The invention also includes a method of assembling a tubular structure assembly having the above characteristics, including:
- a first step of positioning the second portions of the two half-shells diametrically on either side of the first tubular member by a tool pre-positioning itself relative to one reference point belonging to the first tubular member, the tool including two guide pins inserting into the indexing holes of the half-shells,
- a second step of welding the weld seams along to the contact lines of the two half-shells on the first tubular member, said contact lines extending along generating lines of the first tubular member;
- a third step of positioning the end of the second tubular member between the first portion of the two half-shells relative to one point of reference belonging to the first tubular member or relative to an indexing hole of one of the half-shells, by using a tool including a finger inserting into the indexing hole of the second tubular member;
- a fourth step of clamping the two half-shells against the second tubular member; and
- a fifth step of welding the two half-shells on the second tubular member, along the contact lines of the two half-shells, the contact lines extending along the generating lines of the second tubular member.

The invention also relates to an axle of a vehicle wheel having a central portion formed by a tubular structure including at least one of the preceding characteristics.

DESCRIPTION OF THE DRAWINGS

Other advantages and technical characteristics of this invention will become more apparent in light of the following description with reference to the accompanying drawings in which.

Corresponding reference numerals indicate corresponding parts throughout the several figures of the drawings.

DETAILED DESCRIPTION

Figure 1:
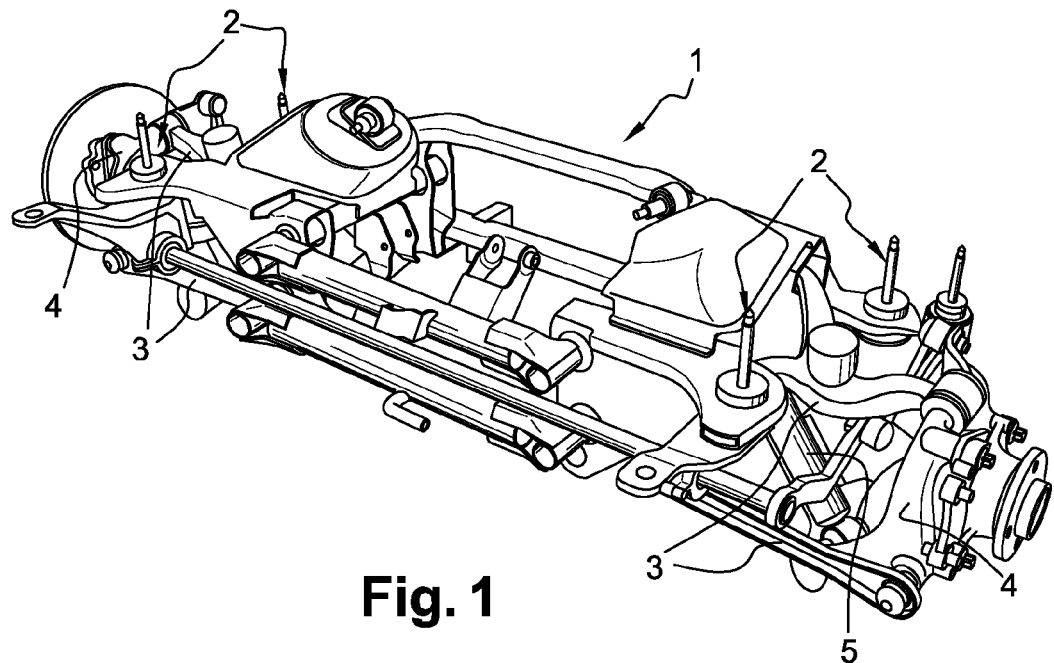
FIG. 1 is a partial perspective view of a rear axle of a vehicle having an axle according to the present invention.

FIG. 1 is a partial perspective view of a rear axle of a vehicle. This rear axle includes an axle 1, fixed to the structure of the vehicle (not shown) via several attachment assemblies 2. The attachment assemblies 2 include an attachment screw positioned in viscoelastic wedges. The rear axle 1 supports different assemblies of suspension arms 3 positioned symmetrically on both sides of this axle 1. Each assembly of suspension arms 3 supports a hub 4 on which a wheel can be attached (not shown). Five sets of damper spring assemblies 5 are positioned on both sides of the axle 1, having a first end secured to the axle 1 and a second end secured to each hub 4.

Figure 2:
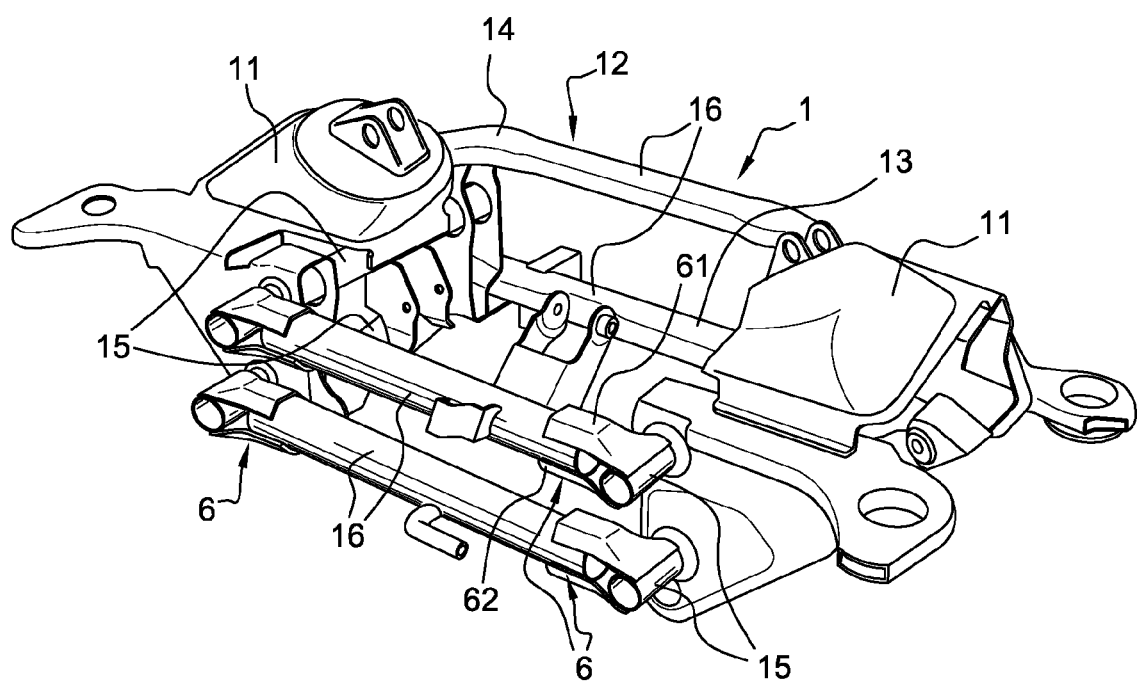
FIG. 2 is a perspective view of the axle according to the present invention.
Figure 3:
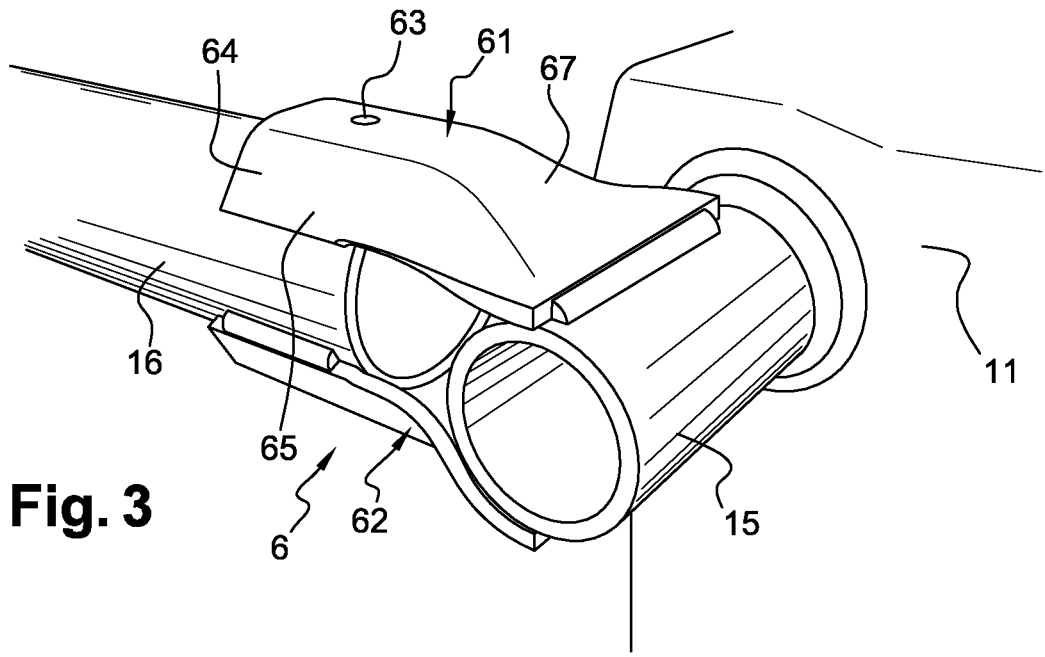
FIGS. 3 and 4 are detailed views of the axle.
Figure 4:
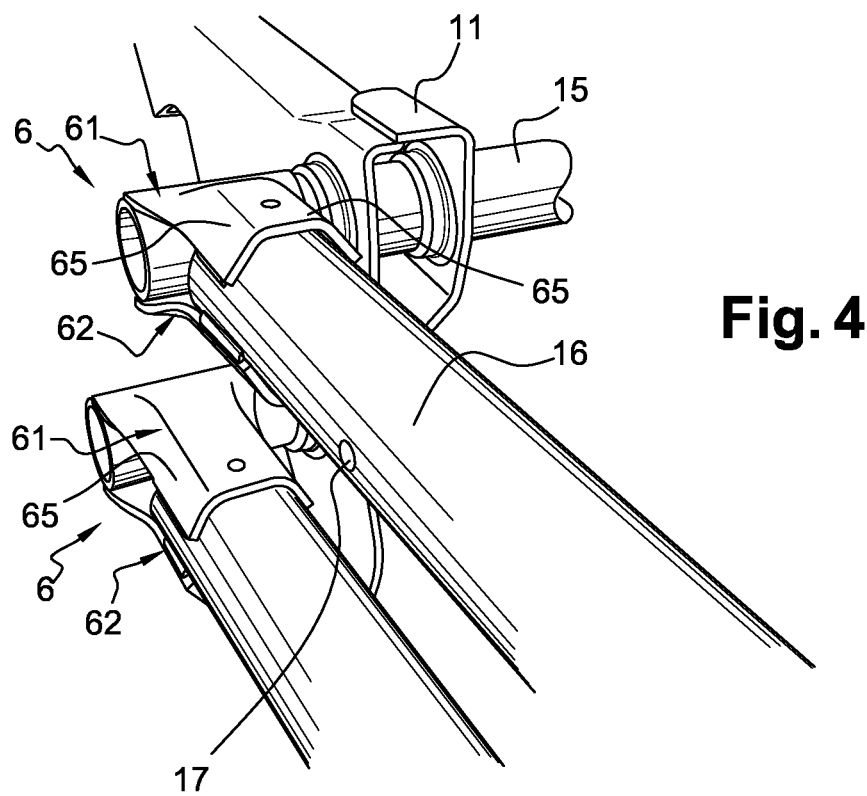

FIGS. 2 to 4 illustrate a perspective view of axle 1 and a detailed view of the axle 1. The axle 1 includes two lateral portions 11 positioned symmetrically on either sides of a central portion 12 which comprises a tubular assembly. Each of the two lateral portions 11 are formed by stamped sheet metal presenting shapes adapted for installation of the attachment assemblies 2 and the suspension arms 3 (FIG. 1). The central portion 12, of the "mechanical welded" type, includes a first tubular frame 13 and a second tubular frame 14, with the second tubular frame 14 generally aligned above the first tubular frame 13. Each of these two tubular frames 13 and 14 are formed of two tubes 15, generally aligned longitudinally with the vehicle, and two tubes 16 aligned generally transversely with the vehicle. The ends of the traverse tubes 16 are connected to the end of one of the longitudinal tubes 15 with a connector 6.

The transverse tubes 16 include a cylindrical portion at each end for attachment of the connector 6 and a central portion, which is not necessarily straight, where any curvatures allow adaption to the environment in which the axle 1 is positioned. The transverse tubes 16 include an indexing hole 17 for positioning during assembly of the axle 1, as explained below.

The longitudinal tubes 15 have a generally cylindrical shape of a constant diameter, for force-fitting into cylindrical openings positioned in the lateral portions 11, interconnecting the two lateral portions 11 to the tubular central portion 12, and forming the axle 1.

The connector 6 is formed from an upper half-shell 61 and of a lower half shell 62, positioned against one another, coming to frame each of the connections between the transverse tubes 16 and the longitudinal tubes 15. The upper half-shell 61 and lower half-shell 62 can either be identical, or contain differences of geometry, for example, where the axes of the ends of the longitudinal tubes 15 and the transverse tubes 16 are not in a same plane. The upper half-shell 61 and lower half-shell 62 include a first portion 64 of a constant cross-section with a transverse section being generally V-shaped or U-shaped, the U-shape preferably being flared. The two arms 65 form an open angle. An indexing hole 63 is defined between these two arms 65, which will be explained further below. This first portion 64 is extended by a second portion 67 progressively flattening until forming a straight section whose end edge is positioned generally perpendicularly to the two parallel edges of the two arms 65. The far side of the second portion 67 acts as contact surface between the half-shells 61 or 62 and the longitudinal tubes 15.

Advantageously for the assembly of the axle 1, the two lateral portions 11, formed by several members made of sheet metal, are assembled on a frame forming a welding template. The geometry of these two lateral portions 11 depends on the final geometry of the axle 1.

The two longitudinal tubes 15 are assembled on each of the two lateral portions 11, which support the transverse tubes 16 and form the lower 13 and upper 14 frameworks. The longitudinal tubes 15 are force-fitted into circular openings defined in the lateral portions 11 and secured by welding seams. Thus, the welding seams run over the intersection between the sides of the circular openings of the lateral portions 11 and the peripheral surface of the longitudinal tubes 15. This creates an axial expansion of the longitudinal tubes 15 that no longer guarantees the axial geometry of the longitudinal tubes 15 after cooling.

Once the longitudinal tubes 15 are secured, the upper half-shell 61 and lower half-shell 62 are assembled by welding close to the ends of these longitudinal tubes 15. The upper half-shell 61 and lower half-shell 62 are positioned on both sides of the longitudinal tubes 15, sandwiching them symmetrically, and following two diametrically opposite positions. The upper half-shell 61 and lower half-shell 62 are pre-positioned by a tool (not shown) during welding. The pre-positioning tool includes positioning pins for insertion into the indexing hole 63 of the upper half-shell 61 and lower half-shell 62, for positioning of the half-shells 61 and 62 relative to the lateral portions 11. As discussed above, this positioning cannot be done relative to the longitudinal tubes 15 because the axial geometry is no longer reliable. Welding seams are formed along the contact lines between the end edges of the second portions 67 of the lower 61 and upper 62 half-shells, and the longitudinal ends of the longitudinal tubes 15. Welding is performed along the generating lines of the longitudinal tubes 15, to limit the expansion effects of the tubes, so that positioning of the upper half-shell 61 and lower half-shell 62 relative to the lateral portions 11 is maintained after the welding has cooled.

Once the upper half-shell 61 and lower half-shell 62 are fixed symmetrically close to each end of the longitudinal tubes 15, they form the supports to position the cylindrical ends of the transverse tubes 16. The indexing holes 17 of the transverse tubes 16 maintain their positions at the time that the upper half-shell 61 and lower half-shell 62 are clamped around the cylindrical ends of these transverse tubes 16. The upper half-shell 61 and lower half-shell 62, which provide a certain flexibility of positioning, can easily adapt to different diameters of tubes. This allows a pre-positioning during welding along the contacts lines between the upper half-shell 61 and lower half-shell 62 and the peripheral surfaces of the ends of the transverse tubes 16. As previously noted, the welding itself is done along generating lines of the ends of the transverse tubes 16, the distortion according to the axial alignment of the ends of these transverse tubes 16 from this fact are negligible. Once the welds are cooled, the geometry and the positioning of the transverse tubes 16 are maintained, guaranteeing the final geometry of the axle 1 is formed.

Each upper half-shell 61 or lower half-shell 62 provides the advantage of being formed from a single metal plate, with a large enough tolerance in the variation of the angle formed between the arms 65 of the V or of the U. The diameter of the cylindrical ends of the transverse tubes 16, while remaining at a reasonable size range, can vary. To permit the welding seams to form along the contact lines between the sides of the arms 65 of the first portions 64 of the upper half-shell 61 and lower half-shell 62 and the lateral surfaces of the ends of the transverse tubes 16, following generating lines of these tubes, the outside diameter of these transverse tubes 16 must remain greater than the deviation of the two parallel sides of the two arms 65 of the upper half-shell 61 or lower half-shell 62.

It is also possible to modify, to a certain extent, while keeping some transverse tubes 16 identical the spacing between the longitudinal tubes 15 and the transverse tubes 16, by modifying the width of the axle 1. Such a spacing is possible because it is not necessary for the transverse tubes 16 to contact the longitudinal tubes 15 for assembly. Therefore, the spacing may vary without weakening the installation.

The axle 1 formed with the tubular assembly provides a significant free interior volume, delimited by the two lateral portions 11 and the two frames 13 and 14, permitting the installation of a rear differential in the case, for example, of a four wheel drive type vehicle or of an electric motor for an application to a hybrid or electric vehicle.

It is well understood that the invention is not limited to embodiments described herein, but enables one skilled in the art to make numerous modifications.

Changes can be made in the above constructions without departing from the scope of the disclosure, it is intended that all matter contained in the above description or shown in the accompanying drawings shall be interpreted as illustrative and not in a limiting sense.

The invention claimed is:

1. A tubular structure, comprising: a portion of a vehicle axle including at least one longitudinal tubular member, at least one transverse tubular member and a connector interconnecting the longitudinal and transverse tubular members by welding, each of said tubular members comprising opposed ends and a side surface; said longitudinal and transverse tubular members being connected such that an end of one of the tubular members faces and is spaced, at least in part, from the side surface of the other tubular member; the connector comprising a first shell and a second shell; said first and second shells being fixed to opposite sides of said transverse and longitudinal tubular members to connect said tubular members; each of said shells comprising a first portion which is welded to the transverse tubular member by at least one first weld bead and a second portion welded to the longitudinal tubular member by at least one second weld bead; said first portions of said first and second shells each having side edges which extend generally parallel to an axis of said transverse tubular member; said first and second shells being sized such that each of said side edges of the first portion of said first shell is spaced apart from each of said side edges of the first portion of said second shell; said at least one first weld bead extending along at least one of said side edges of said first portions of said shells; each connector shell further comprising an indexing hole for positioning the connector shells in relation to a point of reference during assembly by welding the connector shells to the longitudinal tubular member.

2. The tubular structure according to claim 1, wherein the end of the transverse tubular member is proximate the side surface of the longitudinal tubular member, and the axis of the end of the transverse tubular member is essentially in the same plane as the axis of the longitudinal tubular member.

3. The tubular structure according to claim 1, wherein the ends of the two tubular members have a circular cross section.

4. The tubular structure according to claim 3, wherein the first portion of each shell presents a transverse section in general form of a V or U and defines two arms, the ends of the two arms of the U or the V defining contact lines between each shell and the end of the transverse tubular member, said at least one first weld bead being along at least one of said contact lines.

5. The tubular structure according to claim 4, wherein a spacing between the ends of the arms is less than or equal to an outside diameter of the circular end of the transverse tubular member.

6. The tubular structure according to claim 1, wherein the second portion of each shell is shaped to present an essentially flat form in which a far portion of the second portion of each shell presents a straight edge, the straight edge defining a contact line between each shell and the longitudinal tubular member, the at least one second weld bead being along said contact line.

7. The tubular structure according to claim 1, wherein the second portion of each of the shells defines a straight edge; the straight edges of the second portions of the shells sandwiching the longitudinal tubular member.

8. The tubular structure according to claim 7, wherein the transverse tubular member includes an indexing hole spaced from the indexing holes of said connector shells; said indexing hole of said transverse tubular member permitting positioning of the transverse tubular member relative to the longitudinal tubular member or in relation to one of the indexing holes of one of said first and second shells.

9. An axle of a vehicle including a central portion formed by a tubular structure according to claim 1.

10. The tubular structure of claim 1 wherein the end of the one tubular member which faces the other tubular member is generally flat.

11. The tubular structure of claim 1 wherein said at least one first weld bead is distinct from said at least one second weld bead.

12. A method of assembling a tubular structure, comprising the steps of:
   positioning two half-shells each having a first portion and a second portion such that the second portions of the two half-shells are diametrically on opposite sides of a longitudinal tubular member by means of a pre-positioning tool in relation to a point of reference, the tool including two pins penetrating into an indexing hole of each of the aforesaid half-shells,
   welding seams following contact lines of the two half-shells on the longitudinal tubular member, said contact lines extending according to generating lines of the longitudinal tubular member,
   positioning an end of a transverse tubular member between the first portions of the two half-shells in relation to a reference point belonging to the longitudinal tubular member or in relation to one of the indexing holes of one of the half-shells, by using a tool including a projection penetrating in an indexing hole of the transverse tubular member,
   tightening the two half-shells against the transverse tubular member, and
   welding the two half-shells on the transverse tubular member, following contact lines of the two half-shells; said contact lines extending according to generating lines of the transverse tubular member.

* * * * *